(12) United States Patent
Post et al.

(10) Patent No.: US 8,799,555 B2
(45) Date of Patent: Aug. 5, 2014

(54) BOOT DATA STORAGE SCHEMES FOR ELECTRONIC DEVICES

(75) Inventors: Daniel J. Post, Cupertino, CA (US); Matthew Byom, Campbell, CA (US)

(73) Assignee: Apple Inc., Cupertino, CA (US)

( * ) Notice: Subject to any disclaimer, the term of this patent is extended or adjusted under 35 U.S.C. 154(b) by 96 days.

(21) Appl. No.: 13/086,590

(22) Filed: Apr. 14, 2011

(65) Prior Publication Data

US 2012/0265921 A1 Oct. 18, 2012

(51) Int. Cl.
*G06F 13/28* (2006.01)

(52) U.S. Cl.
USPC ........................................................ 711/103

(58) Field of Classification Search
CPC ... G06F 9/4401; G06F 9/445; G06F 12/0638; G06F 12/0246; G06F 11/1417; G06F 2211/1096
USPC ........................................................ 711/103
See application file for complete search history.

(56) References Cited

U.S. PATENT DOCUMENTS

| | | | | |
|---|---|---|---|---|
| 5,497,492 A | * | 3/1996 | Zbikowski et al. | 713/2 |
| 6,185,569 B1 | * | 2/2001 | East et al. | 1/1 |
| 7,073,053 B1 | * | 7/2006 | Oz et al. | 713/2 |
| 7,103,684 B2 | * | 9/2006 | Chen et al. | 710/62 |
| 2007/0083491 A1 | * | 4/2007 | Walmsley et al. | 707/3 |
| 2007/0239977 A1 | * | 10/2007 | Wu | 713/2 |
| 2010/0042773 A1 | * | 2/2010 | Yeh | 711/103 |
| 2011/0289352 A1 | * | 11/2011 | Lee et al. | 714/20 |
| 2012/0054476 A1 | | 3/2012 | Duda et al. | |

* cited by examiner

*Primary Examiner* — Alford Kindred
*Assistant Examiner* — Rocio Del Mar Perez-Velez
(74) *Attorney, Agent, or Firm* — Van Court & Aldridge LLP

(57) ABSTRACT

Systems and methods are provided for storing and retrieving boot data (e.g., a first stage bootloader) in and from a non-volatile memory ("NVM"), such as a NAND flash memory. To increase storage reliability, the boot data may be stored in a subset of the pages in a boot data storage area, such as in only lower pages. The subset may be selected based on the specific operating specifications and characteristics of the NVM. To prevent a boot ROM from having to maintain a NVM-specific map of which pages are used to store boot data, the map may be maintained in the NVM itself. For example, the map may be in the form of a linked list, where each page storing boot data can include a pointer that points to the next page that stores boot data.

19 Claims, 6 Drawing Sheets

BOOT DATA STORAGE SCHEMES FOR ELECTRONIC DEVICES

BACKGROUND OF DISCLOSURE

NAND flash memory, as well as other types of non-volatile memories ("NVMs"), are commonly used in electronic device for mass storage. For example, consumer electronics such as portable media players, often include NAND flash memory to store music, videos, and other media programs. A NVM may store such data using single-level cells ("SLC"), where each memory cell of the NVM can store one of two bit values, or multi-level cells ("MLC"), where each memory cell can store one of four or more bit strings.

When an electronic device is being powered up or rebooted, an operating system can be booted up from a NVM of the electronic device. The bootup of the operating system can proceed in multiple stages. For example, the electronic device can be configured to first execute code from a mask read-only memory ("ROM"). The code can include instructions to load a bootloader, such as a first stage bootloader, from a flash memory to a volatile memory. The task of booting up a second stage bootloader and/or the kernel and operating system of the electronic device may then be transferred from the mask ROM code to the first stage bootloader. The successful completion of this bootup procedure is typically critical for the electronic device to function properly.

SUMMARY OF THE DISCLOSURE

Systems and methods are provided for storing and retrieving boot data, such as a bootloader, in and from a NVM (e.g., NAND flash memory). The disclosed embodiments provide, among other things, techniques to ensure the reliable storage and retrieval of such boot data, thereby allowing for consistent and successful startup of an electronic device.

A NVM provided in an electronic device may include a boot data storage area in which boot data is stored. "Boot data" may refer to any information, such as a bootloader (e.g., a first stage bootloader), that is loaded from the NVM based on code stored in a boot ROM (e.g., a mask ROM). In some embodiments, during a firmware update or other restore process, the boot data may be stored in only a subset of the memory locations in the boot data storage area. The subset can include nonconsecutive pages in one or more blocks of the non-volatile memory. For example, upper pages may generally have higher bit error rates than lower pages, and therefore to increase storage reliability, the boot data may be stored only in lower pages. The remaining pages not in the subset can be left unprogrammed or may be programmed with a pattern (e.g., a random whitened pattern) designed to improve storage reliability of the boot data.

In some embodiments, the NVM can store a map indicating which memory locations are being used to store boot data. For example, using a linked-list format, each page storing boot data can have metadata that includes a "next page pointer" pointing to the next page that contains boot data. In some embodiments, each of these pages may include a "prior page pointer" pointing to a previous page that includes boot data. Using these pointers, the electronic device can load the boot data and verify that pages expected to have boot data actually contain boot data (and vice versa). If such verification fails, the electronic device can signal a boot failure unless a redundant copy of the boot data is stored elsewhere in the boot data storage area. Thus, storing a map of pages containing boot data can provide a way to verify that all of the boot data is accounted for and that the boot data can be properly loaded from the NVM.

Moreover, storing such a map can improve the design of program code stored in a boot ROM, because the same code can be applied regardless of the type or manufacturer of the NVM. Different NVMs, such as flash memories provided by different manufacturers, can have distinct operating specifications and characteristics. For example, different manufacturers may specify a different ordering of lower pages versus upper pages. By storing a map within the NVM itself, the NVM can essentially provide instructions to the mask ROM code on how to navigate through itself to obtain the boot data. Such NVM-specific information can be left out of the mask ROM. Using this approach, the same boot ROM may be used with different NVMs. That is, the boot ROM does not need to be switched out if a different NVM is installed in the electronic device. Instead, a firmware update may be issued to identify the newly installed NVM, to determine its specific operating specifications and characteristics, and to store the boot data in a suitable subset of the NVM pages based on the NVM's operating specifications and characteristics.

In addition, the map stored on an NVM may be customized to that particular unit. For example, each particular NVM unit may have a specific set of bad blocks that are accumulated due to factory defect or through use. In these situations, the map can be used to identify and skip over the blocks that are bad.

BRIEF DESCRIPTION OF THE DRAWINGS

The above and other aspects and advantages of the invention will be apparent upon consideration of the following detailed description, taken in conjunction with accompanying drawings, in which like reference characters refer to like parts throughout, and in which.

DETAILED DESCRIPTION

Figure 1:
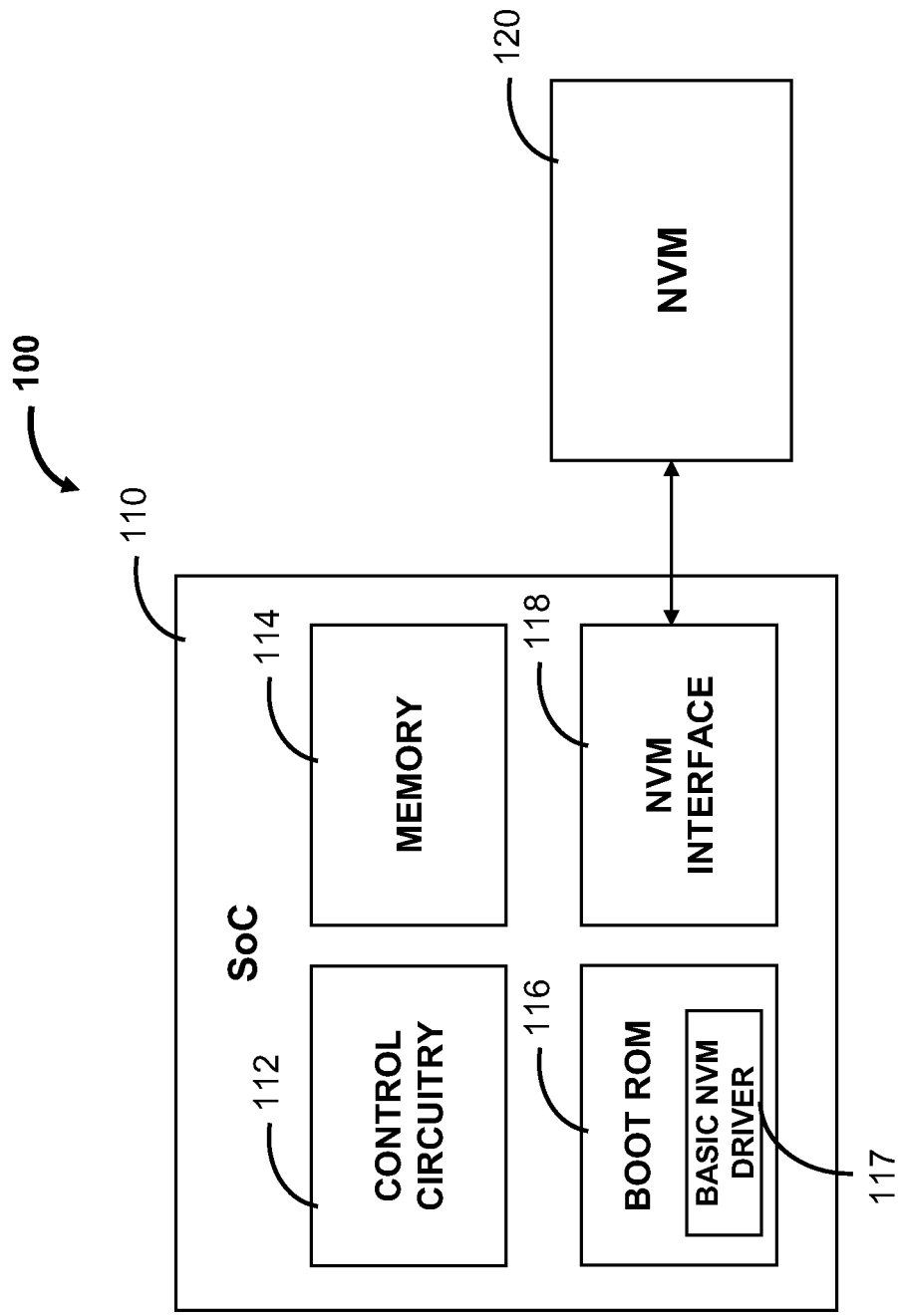
FIG. 1 is a block diagram of an illustrative electronic device having a non-volatile memory configured in accordance with various embodiments of the invention.

FIG. 1 is a block diagram of illustrative electronic device 100. In some embodiments, electronic device 100 can be or can include a portable media player (e.g., an iPod™ made available by Apple Inc. of Cupertino, Calif.), a cellular telephone (e.g., an iPhone™ made available by Apple Inc.), a pocket-sized personal computer, a personal digital assistance ("PDA"), a desktop computer, a laptop computer, and any other suitable type of electronic device or system.

Electronic device 100 can include system-on-a-chip ("SoC") 110 and non-volatile memory ("NVM") 120. NVM 120 can include a NAND flash memory based on floating gate or charge trapping technology, NOR flash memory, erasable programmable read only memory ("EPROM"), electrically erasable programmable read only memory ("EEPROM"), Ferroelectric RAM ("FRAM"), magnetoresistive RAM ("MRAM"), or any combination thereof.

NVM 120 can be organized into "blocks", which is the smallest erasable unit, and further organized into "pages," which may be the smallest unit that can be programmed or read. In some embodiments, NVM 120 can include multiple integrated circuits, where each integrated circuit may have multiple blocks. The blocks from corresponding integrated circuits (e.g., blocks having the same position or block number) may form logical units referred to as "super blocks." Each memory location (e.g., page or block) of NVM 120 can be addressed using a physical address (e.g., a physical page address or physical block address).

The memory cells in NVM 120 can be configured as single-level cells ("SLC") or multi-level cells ("MLC"). For MLC embodiments, because each memory cell can represent more than one bit, a group of such cells can represent more than one page. For example, for two-bit MLC, each group of memory cells can represent an "upper page" (associated with one of the two bits of each cell) and a "lower page" (associated with the other of the two bits in each cell). While the terms "upper" and "lower" pages may be used throughout this disclosure, it should be understood that the invention is not limited to two-bit MLC. The terminology is intended only to illustrate that at least two distinct pages can be associated with the same group of memory cells.

System-on-a-chip 110 can include control circuitry 112, memory 114, boot ROM 116, and NVM interface 118. Control circuitry 112 can control the general operations and functions of SoC 110 and electronic device 100 in general. Control circuitry 112 can include any suitable components, circuitry, or logic, such as one or more processors. Control circuitry 112 may operate under the control of a program, such as an application, operating system, a NVM driver, or a bootloader loaded in memory 114. At bootup of electronic device 100, control circuitry 112 may operate under the control of program code stored in boot ROM 116.

Memory 114 can include any suitable type of volatile memory, such as random access memory ("RAM") (e.g., static RAM ("SRAM"), dynamic random access memory ("DRAM"), synchronous dynamic random access memory ("SDRAM"), double-data-rate ("DDR") RAM), cache memory, or any combination thereof. In some embodiments, memory 114 may act as the main memory for any processors implemented as part of control circuitry 112.

Boot ROM 116 can include any suitable read-only memory ("ROM"), such as a mask ROM. Boot ROM 116 may be configured to store program code that is executed by control circuitry 112 on bootup of electronic device 100. The program code may be executed to begin loading additional information from NVM 120 into memory 114. This additional information may include firmware, such as a first stage bootloader, that, once loaded into memory 114, is used by electronic device 100 to load a second stage bootloader or the kernel and operating system of electronic device 100. For clarity, the program code stored in boot ROM 116 may sometimes be referred to as "mask ROM code," and the firmware (or other data) retrieved from NVM 120 by the mask ROM code may sometimes be referred to as "boot data."

The mask ROM code in boot ROM 116 can include firmware for a basic NVM driver 117. Basic NVM driver 117 may enable electronic device 100 to perform basic reading and processing operations on NVM 120 and the data stored therein (e.g., boot data). This way, with the aid of NVM interface 118, control circuitry 112 can obtain the boot data from NVM 120. Once the operating system is loaded and control of processor 112 is transferred to the operating system, basic NVM driver 117 can be superseded by additional NVM drivers loaded in memory 114 (i.e., from NVM 120) that provide a wider range of functionality, such as interpreting file system commands, performing memory management functions for NVM 120 (e.g., garbage collection, wear leveling, etc.), and updating the boot data in NVM 120 during device restore procedures.

NVM interface 118 may include any suitable circuitry or components that enable SoC 110 to access NVM 120 and its memory locations. For example, NVM interface 118 can include a bus controller for generating and providing read and programming instructions compatible with the bus protocol of NVM 120. In some embodiments, some of the components and functions of NVM interface 118, as well as some of the functionality of any NVM drivers, may be implemented and performed by a separate memory controller (e.g., flash controller) included, for example, in NVM 120. Thus, it should be understood that any descriptions of NVM interface 118 or NVM-related functionality are not limited to components or actions performed on SoC 110.

In some embodiments, boot data may be stored in an area of NVM 120 referred to sometimes as the "boot data storage area." The boot data storage area may be a logical or physical partition in NVM 120 dedicated to storing boot data. This may represent the area of NVM 120 that is addressable, and therefore accessible, by the basic NVM driver 117 of boot ROM 116. The boot data storage area can include any suitable number of integrated circuits, blocks, or pages. For example, the boot data storage area can include multiple super blocks.

In some embodiments, to improve system reliability, the boot data storage area may be of sufficient size to store multiple copies of the boot data. For example, a copy of the boot data may be stored in each of several integrated circuits (e.g., one copy in each block of a super block), or in each of several blocks of the same integrated circuit. The location and size of the boot data storage area in NVM 120 may be based on the particular type of NVM (e.g., a particular NVM manufacturer) installed in electronic device 100.

During a firmware update or other restore procedure on electronic device 100, boot data may be stored in a subset of the memory locations in the boot data storage area. The pages in the subset may be chosen to increase storage reliability of the boot data, and may be selected using any suitable technique. For example, if NVM 120 is configured using MLC, boot data may be stored only in the lower pages of the boot data storage area. Because the lower pages of NVM 120 may have lower error rates than the upper pages, this technique may provide increased storage reliability. In some embodiments, pages that are known to be less reliable in a particular NVM may be excluded from the subset. For example, the last one or more pages in a block may be excluded. These and other approaches may be used individually or in combination to select a subset of pages for storing boot data. Thus, it should be understood that the invention is not limited to any one technique for selecting the subset (e.g., using all lower pages and excluding all upper pages).

In some embodiments, a restore procedure on electronic device 100 may leave pages that are excluded from the subset unprogrammed. Alternatively, the restore procedure may involve programming the excluded pages with a pattern designed to further increase the reliability of boot data storage. A randomized whitened pattern, for instance, may be chosen and programmed into the excluded pages. Because the stored pattern may ultimately be ignored during bootup, a pattern stored in an excluded page may sometimes be referred to as "non-data," and a page excluded from the subset may be referred to as a "non-data page." Pages containing boot data, on the other hand, may sometimes be referred to as "boot data pages."

Figure 2:
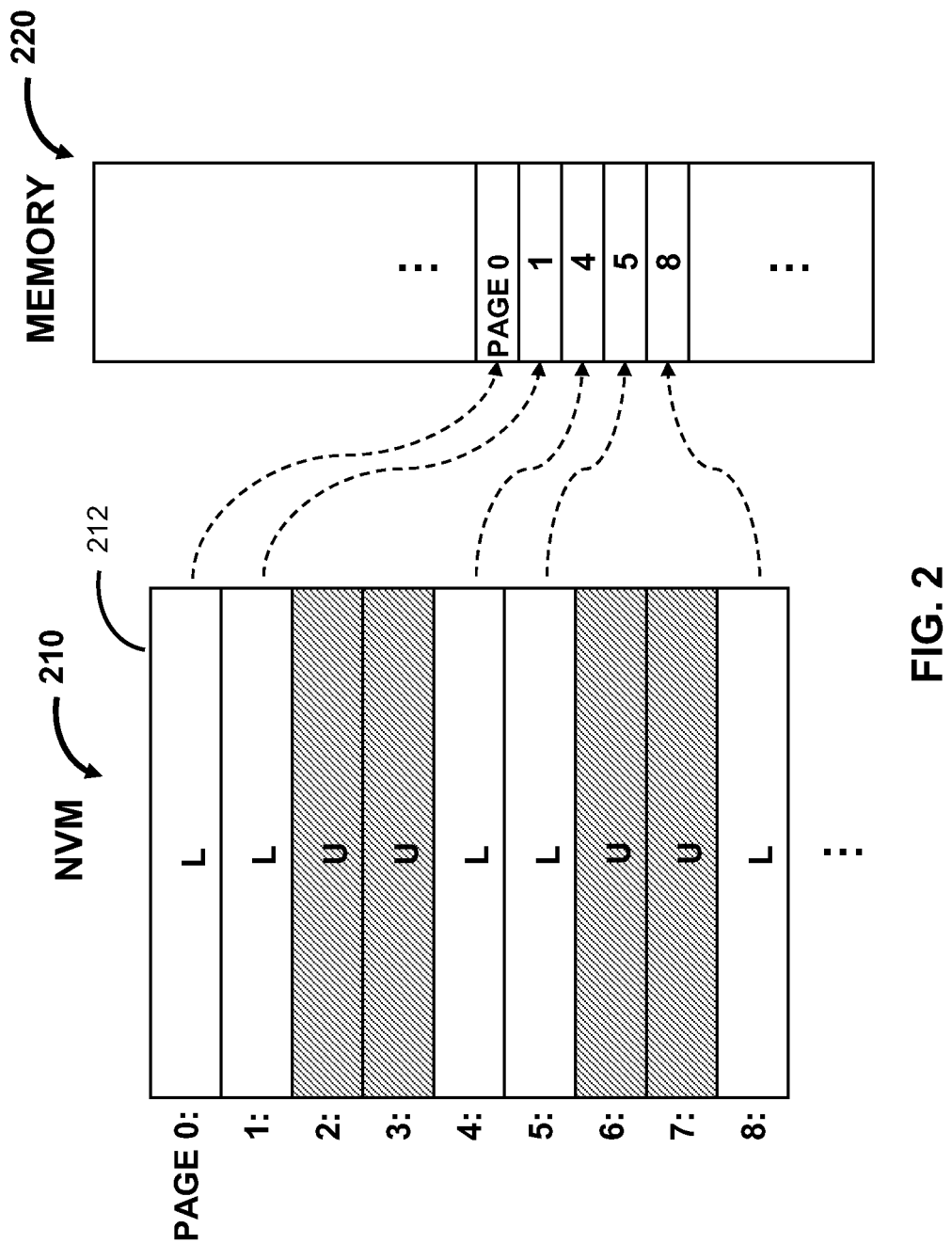
FIG. 2 is a graphical view of memory locations in an illustrative non-volatile memory and an illustrative volatile memory, which illustrates the loading of boot data from the non-volatile memory to the volatile memory, in accordance with various embodiments of the invention.

Referring now to FIG. 2, an example is provided illustrating how boot data may be stored in a subset of memory locations in a boot data storage area. FIG. 2 is graphical view of memory 220 and of a portion of a block 212 from illustrative NVM 210. In particular, FIG. 2 provides a graphical view of the operation performed to load boot data from block 212 to memory 220 during bootup of an electronic device. Block 212 includes a sequence of pages (e.g., pages 0, 1, 2, and so on), where the sequence of pages may indicate the order that the pages would typically be addressed for programming or reading. Block 212 may illustrate the state of a block in the boot data storage area of NVM 120 (FIG. 1), and memory 220 may illustrate the state of memory 114 (FIG. 1) after electronic device 100 (FIG. 1) has finished loading the boot data from memory 114.

In FIG. 2, the "L" and "U" designations within block 212 indicate which pages are lower pages and which pages are upper pages. Thus, in this particular example, boot data is shown as being stored only in the lower pages (e.g., pages 0, 1, 4, 5, and N) of block 212, which can improve the reliability of the system. The ordering of lower pages and upper pages in a block may be NVM-specific (e.g., specified by the particular manufacturer of the NVM 210). Therefore, in situations where an NVM is used that has a different sequence of lower and upper pages (e.g., "L," "U," "L," "U," and so on), the subset of pages chosen to act as boot data pages may be different. Moreover, as described above, while block 212 is illustrated as using only lower pages to store boot data, it should be understood that other approaches to select the subset of boot data pages may be used.

FIG. 2 further demonstrates that the subset of pages selected to store boot data may be nonconsecutive. That is, in a sequence of pages, one or more non-data pages may be intermixed with pages containing boot data.

The electronic device can load the boot data from a NVM to memory in the manner illustrated in FIG. 2. In particular, the electronic device can be configured such that ultimately only information from the nonconsecutive boot data pages of NVM 210 end up in consecutive pages of memory 220. This way, once control of the electronic device is transferred to memory 220, the boot data is available in a form suitable for execution by control circuitry. In some embodiments, the loading of boot data can be accomplished by incrementally processing and validating pages as the pages are being read. In other embodiments, the electronic device can first load the contents of all of the pages in the boot data storage area (including the non-data pages) into memory 220. The loaded content may then be post-processed to discard the unneeded information obtained from the non-data pages.

To determine which pages to discard when loading boot data, the electronic device can use one or more maps. A stored map may indicate which memory locations are currently storing boot data, and the maps can be stored in the boot data storage area of a NVM along with the boot data. This way, the mask ROM code from a boot ROM (e.g., boot ROM 116) can be designed to use the map when locating the boot data, and the mask ROM code does not need to have its own map of the boot data storage area. Because different NVMs may have distinct operating specifications (e.g., a different ordering of lower pages versus upper pages in a block) and error characteristics (e.g., which pages may be less reliable), this allows different subsets of pages in different NVMs to be used for storing boot data without having to provide different boot ROMs.

In addition, the map stored on an NVM may be customized to that particular unit (and not just to a particular NVM type or manufacturer, etc.). For example, each particular NVM unit may have a specific set of bad blocks that are accumulated due to factory defect or through use. In these situations, the map can be used by the electronic device to identify which blocks are bad and to skip over those blocks when retrieving boot data.

A map can be stored in NVM 210 using any suitable format. In some embodiments, the map may be in the form of a bitmap that describes the contents of the boot data storage area. In some embodiments, the map may be in the form of a linked-list.

Figure 3:
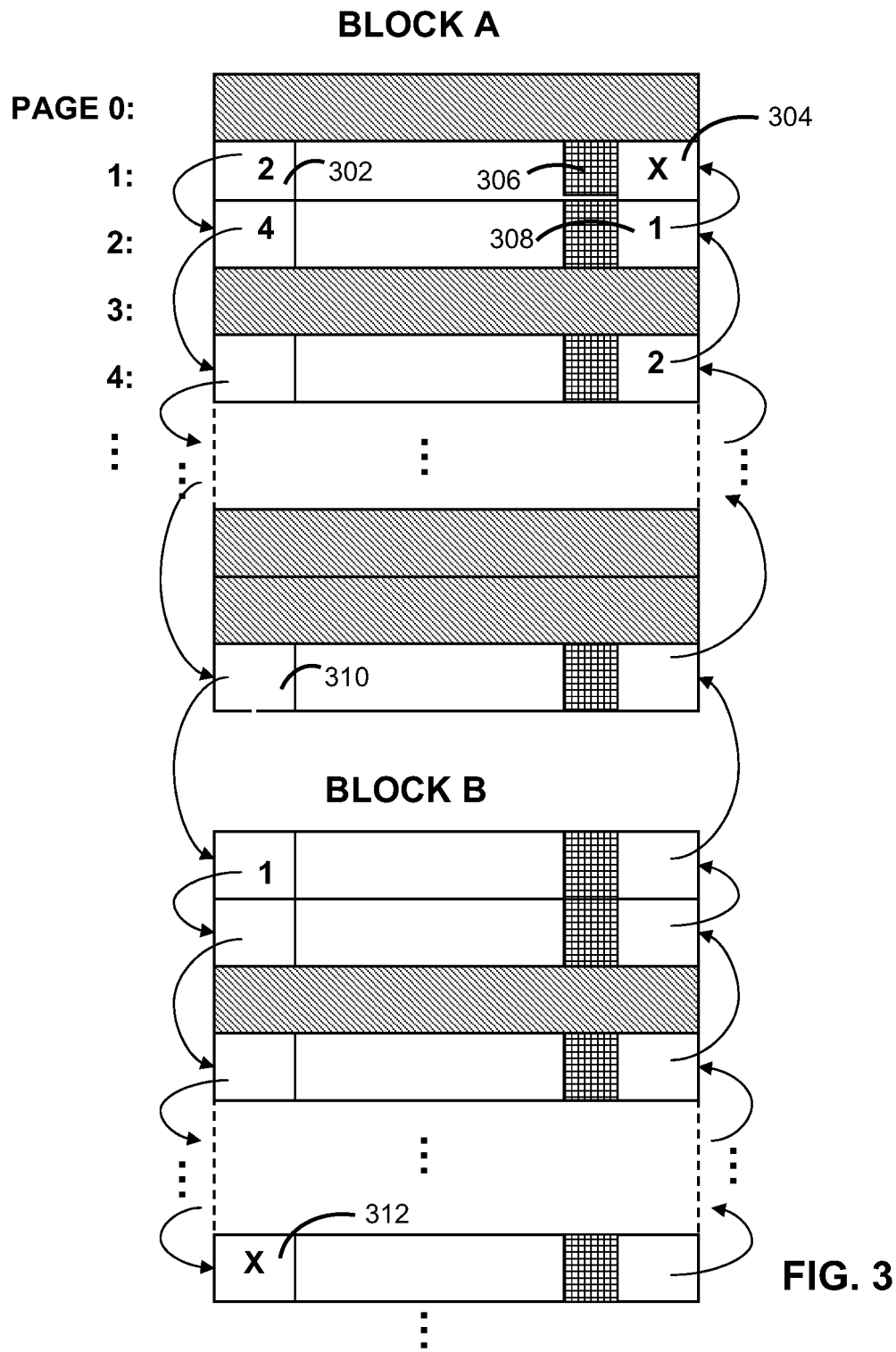
FIG. 3 is a graphical view of memory locations, and of metadata stored therein, in two blocks in an illustrative non-volatile memory in accordance with various embodiments of the invention.

FIG. 3 illustrates ways in which a linked-list format may be used to store a map of which pages are currently used as boot data pages. FIG. 3 is a graphical view of two illustrative blocks, blocks A and B, of a non-volatile memory. The graphical view of blocks A and B may represent the state of two blocks in the boot data storage area of NVM 120 (FIG. 1). Blocks A and B may be consecutive or nonconsecutive blocks in the same integrated circuit, or blocks A and B may be blocks in different integrated circuits or NVM packages.

In blocks A and B, each of the boot data pages can store both data (e.g., boot data) and metadata. The metadata for page 1, for example, can include a next page pointer 302 and a prior page pointer 304. The boot data pages of blocks A and B may form a first linked list using the next page pointers, including next page pointer 302. The boot data pages can also form a second linked list using the prior page pointers, including prior page pointers 304 and 308. The metadata in each boot data page can further include a boot data page indicator, such as boot data page indicator 306.

Looking first at the linked-list formed by the next page pointers, the next page pointers in blocks A and B can each reference the next boot page in the sequence. Next page pointer 302 of page 1, for example, can provide the address of page 2. Because the pages containing boot data may be nonconsecutive, a next page pointer for a particular page does not necessary point to the very next page in the sequence. For instance, the next page pointer for page 2 may reference page 4, thereby skipping over non-data page 3. The stored address of a next page pointer (or any other types of pointers described in this disclosure) can take on any suitable form. For example, the next page pointer can be an address referencing another page in the same block (as with next page pointer 302). Alternatively, the next page pointer can reference another page in a different block of the same or a different integrated circuit (as with next page pointer 310).

In some embodiments, the electronic device can use the next page pointers to verify the integrity of boot data storage. For example, since next page pointer 302 points to page 2, page 2 is expected to contain boot data. The electronic device may confirm that page 2 provides boot data by, for instance, employing an error correcting code on the contents of page 2. If the error correction results in uncorrectable errors, the boot data for page 2 may be unobtainable, and the electronic device may not have all of the boot data necessary for device operation (unless another copy of the boot data is located elsewhere). In this case, the electronic device may signal a boot failure. Without next page pointer 302 (or other suitable metadata), it would be unclear whether the failed verification indicates that boot data has been lost (as would be the case with page 2) or whether the failed verification indicates that the page is actually a non-data page (as would be the case if verification were attempted on page 3). Thus, the linked-list format provided by the next page indicators can ensure that all of the pages containing boot data are accounted for.

Referring now to the prior page pointers within the boot data pages, such as prior page pointers 304 and 308, these pointers can form a linked-list similar to the link-list formed by the next page pointers, except that the prior page pointers are directed in the opposite direction (i.e., up the sequence instead of down the sequence). Prior page pointer 308 of page 2 can therefore reference page 1. If boot data storage starts at page 1 of block A, there may not be a previous page for prior page pointer 304 to reference. In this case, prior page pointer 304 may take on any suitable value to indicate that boot data storage starts here, such as the value −1. Similarly, any suitable value (e.g., −1) may be used for next page pointer 312 to indicate that there are no more boot data pages in the sequence for the electronic device to read or process.

As with the next page pointers, the prior page pointers may allow an electronic device to verify and account for all of the boot data stored in the NVM. For example, after processing page 1, and when processing the contents of page 2, the electronic device can ensure that prior page pointer 308 of page 2 references the just-processed page 1. Otherwise, if prior page pointer 308 references an unexpected, different page, there is likely missing or corrupted boot data, and a boot failure may need to be signaled. Thus, the electronic device can use just the prior page pointers or the prior page pointers in conjunction with other metadata (e.g., next page pointers) to verify and account for all of the boot data stored in the NVM.

The electronic device may use the prior page pointers, in particular, to account for the first boot data page. Initially, mask ROM code may specify that the electronic device begin looking for boot data at a particular page, such as page 0 of block A, which may not actually correspond to the first boot data page (here, page 1 of block A). Thus, the electronic device can read and/or process the sequence of pages from page 0 to page 1 to page 2, and so on, looking for the first boot data page. If page 1 were corrupted with uncorrectable errors, page 2 might be the first boot data page that the electronic device is able to successfully process. In this case, because prior page pointer 308 points to page 1 instead of indicating that page 2 is the first page, the electronic device is able to determine that boot data from at least one boot data page has been lost. The electronic device may therefore signal a boot failure or may try loading a redundant copy of the boot data from another location in the NVM. Without the prior page indicators, the electronic device might have proceeded under the erroneous assumption that page 2 is the first boot data page. Thus, the prior page pointers allow for boot data to be more reliably stored, as well as allowing for boot data storage to begin at a page other than the very first page read specified by the mask ROM code. This provides added flexibility in choosing which subset of pages to use for storing boot data.

In some embodiments, each boot data page may include metadata indicating that the page contains boot data and is not a non-data page. For example, page 1 of block A can include boot data indicator 306. Boot data indicator 306, as well as the other boot data indicators, can take on any suitable value. These boot data indicators can provide another way in which the electronic device can verify that a page is a boot data page. In some embodiments, also for verification purposes, the non-data pages may be programmed with non-data indicators to show that these pages do not contain boot data.

While the boot data pages in FIG. 3 are shown as each having a next page pointer, a prior page pointer, and a boot data indicator, it should be understood that some of this metadata may be omitted. For example, some electronic devices may be configured to use only next page pointers and not prior page pointers, and vice versa.

Figure 4:
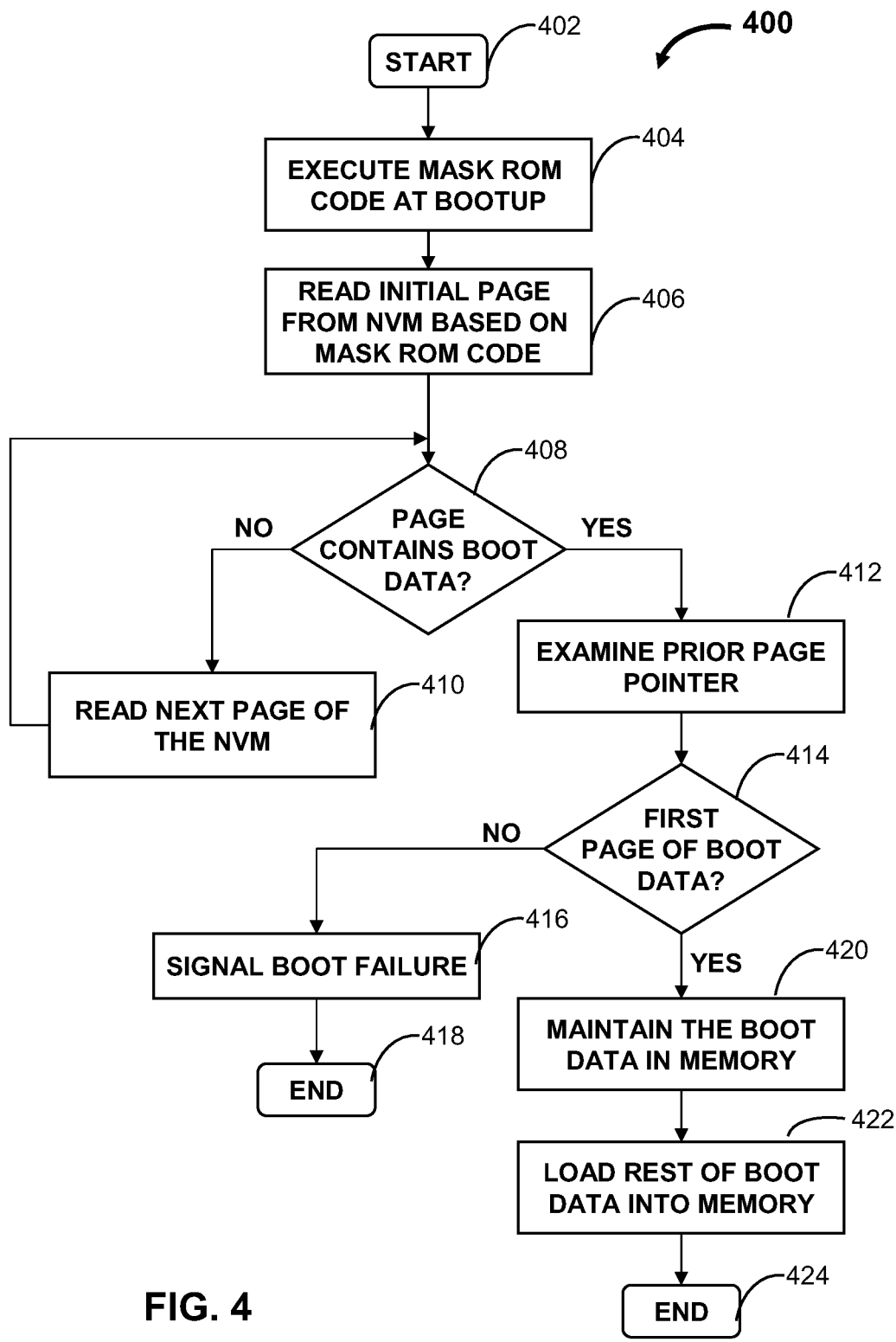
FIG. 4 is a flowchart of an illustrative process for initiating bootup of an electronic device in accordance with various embodiments of the invention.
Figure 5:
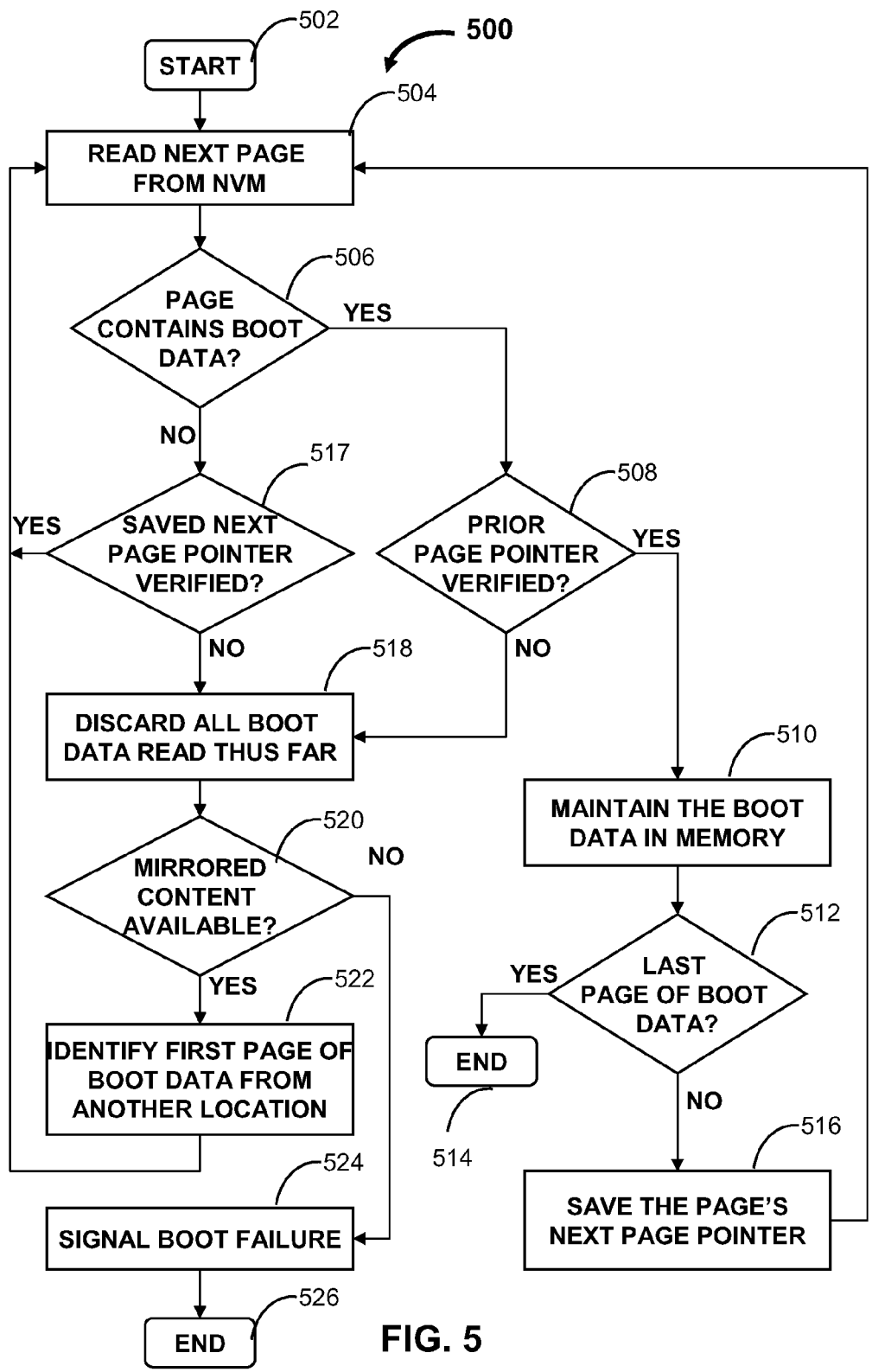
FIG. 5 is a flowchart of an illustrative process for reading and processing boot data from a non-volatile memory in accordance with various embodiments of the invention.
Figure 6:
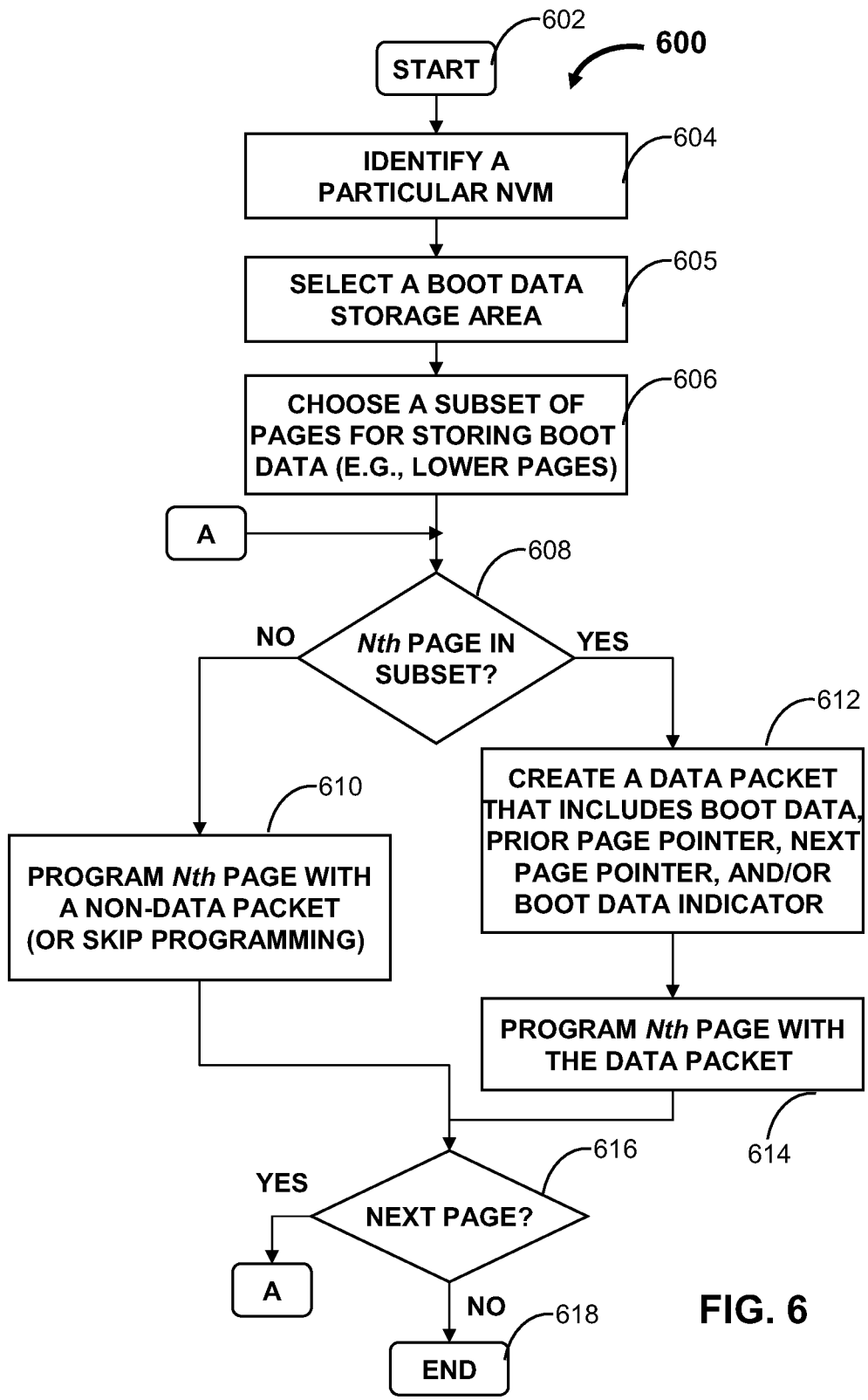
FIG. 6 is a flowchart of an illustrative process for storing boot data in a non-volatile memory in accordance with various embodiments of the invention.

Referring now to FIGS. 4-6, flowcharts of illustrative processes are shown in accordance with various embodiments of the invention. The steps of these illustrative processes may be performed by any suitable component or combination of components in an electronic device, such as by control circuitry 112 of FIG. 1. Where appropriate, these components may operate under the control of mask ROM code (e.g., from boot ROM 116) or from an operating system and NVM driver.

Turning first to FIG. 4, a flowchart of illustrative process 400 is shown for initiating bootup of an electronic device. Process 400 may be performed to identify which memory location of a non-volatile memory contains the first page of boot data (e.g., bootloader data). Using the steps of process 400, boot data does not need to be stored at the first memory location addressed by the mask ROM code, and can instead begin at a suitable memory location (e.g., more reliable location) for a particular non-volatile memory.

Process 400 may begin at step 402 in response to, for example, a startup or reboot command of the electronic device. At step 404, the electronic device may begin executing mask ROM code from a boot ROM, such as boot ROM 116 of FIG. 1. At step 406, the boot ROM data may instruct the electronic device to read an initial page from the non-volatile memory. The initial page may, for example, be the first page (i.e., page 0) of the first block (i.e., block 0) in a first integrated circuit (i.e., chip 0) of the non-volatile memory. Then, at step 408, the electronic device may determine whether the initial page contains boot data. In some embodiments, this determination can be performed by employing an error correcting code on the initial page data to check for a valid codeword, or by checking a program status of the initial page to determine whether the initial page is programmed or unprogrammed. In addition or alternatively, this determination can involve checking for a boot data indicator or a non-data indicator in the metadata of the current initial page.

If, at step 408, the electronic device determines that the initial page does not contain boot data, process 400 can continue to step 410. At step 410, the electronic device may read the next page of the non-volatile memory, and process 400 can return to step 408 so that the electronic device can determine whether storage of the boot data begins at a subsequent page. If, at step 408, the electronic device determines instead that the initial page does contain boot data, process 400 may continue to step 412.

At step 412, the electronic device can examine the prior page pointer from the metadata of the current page. In particular, at step 414, the electronic device can determine whether the prior page pointer indicates that the current page is the first page of boot data. If the prior page pointer points to a previous page instead of showing that the current page is the first page, this is an indication that the electronic device was previously unsuccessful at reading the first boot data page. That is, the current page may be a second or subsequent page used to store boot data, and the first page of boot data may have been lost due to error. Because the electronic device is missing boot data, which may be critical for device operation, the electronic device may signal a boot failure at step 416. For example, the electronic device may stop the bootup process and may display an error message to the user. Process 400 may then end at step 418 so that the user can perform a restore operation to update the firmware (including the boot data) stored in the non-volatile memory.

Returning to step 414, if the electronic device determines that the current page is the first page of boot data, the electronic device can maintain the boot data in memory at step 420. In this scenario, the electronic device may have successfully found the first boot data page. The electronic device may then load the rest of the boot data into memory at step 422. For example, the rest of the boot data may be loaded using the steps of process 500 of FIG. 5, described in greater detail below. Process 400 may end at step 424, at which time the electronic device may give control of the bootup process from the mask ROM code to the boot data.

Referring now to FIG. 5, a flowchart of illustrative process 500 is shown for loading boot data into memory. In some embodiments, process 500 may demonstrate the steps taken at step 422 of process 400 after the first page of boot data has been identified and loaded into memory.

Process 500 may begin at step 502. At step 504, the electronic device may read a page from the non-volatile memory. For example, once the electronic device identifies and processes the first boot data page (i.e., using process 400 of FIG. 4), the electronic device can read from the page immediately following the first boot data page.

Then, at step 506, the electronic device may determine whether the current page contains boot data. In some embodiments, this determination can be performed by employing an error correcting code on the current page data to check for a valid codeword, or by checking a program status of the initial page to determine whether the initial page is programmed or unprogrammed. In addition or alternatively, this determination can involve checking for a boot data indicator or a non-data indicator. If the electronic device determines that the current page contains boot data, the electronic device can verify the prior page pointer of the current page data. That is, at step 508, the electronic device can confirm whether the prior page pointer points back to the expected page (i.e., the most recently read and/or processed boot data page).

If, at step 508, the prior page pointer can be verified, the electronic device can maintain the boot data from the current page in memory. Thus, by performing steps 506 and 508 before deciding to maintain the boot data, the electronic device can perform several checks on the validity and accuracy of the boot data stored in the non-volatile memory. This may be beneficial, because accurate boot data may be critical to the operation of the electronic device.

Following step 510, the electronic device can determine at step 512 whether the current page contains the last page of boot data. For example, the electronic device can examine the next page pointer to determine whether the pointer references a subsequent page of the non-volatile memory, or whether the pointer indicates that there are no more pages of boot data. If the current page is the last page, process 500 may end at step 514. At this point, all of the boot data may be stored in memory, so the electronic device may transfer control of the bootup process from the mask ROM code to the boot data. If the current page is not the last page, process 500 may instead continue to step 516, where the electronic device can save the current page's next page pointer for use in processing subsequent pages. Process 500 may then return to step 504, where the electronic device can continue reading pages from the non-volatile memory to obtain the rest of the boot data.

Returning to step 506, if the electronic device determines that the current page does not contain boot data, the current page may be a non-data page. Thus, at step 517, the electronic device can refer to a next page pointer, which was saved from a previous boot data page (e.g., from a previous iteration of step 516). The electronic device can determine whether this saved next page pointer references a subsequent page (and not the current page). If the electronic device determines that the saved next page pointer references a different page, and therefore the current page should not contain boot data, process 500 can return to step 504 without maintaining information from the current non-data page.

If, however, at steps 517 or 508, the electronic device fails to confirm the presence of boot data when boot data should be present or fails to verify the prior page indicator, this may be a sign of errors in the boot data. Thus, at step 518, the electronic device may discard all of the boot data read thus far. The availability of mirrored content may then be determined at step 520 to see whether boot data can be obtained from another location in the boot data storage area. If mirrored content is available, the electronic device can begin loading boot data from the other area of the NVM to replace the discarded boot data. In particular, at step 522, the electronic device can identify the first boot data page from another location, such as by using process 400 of FIG. 4, and may then return to step 504 to finish loading boot data from the other location.

Returning to step 520, the NVM interface may determine that mirrored content is not available, such as if only one copy of the boot data is stored in the NVM or if the electronic device has already unsuccessfully attempted to load all other copies of the boot data. In this case, process 500 may move from step 520 to step 524, at which point a boot failure may be signaled. For example, the electronic device may stop the bootup process and may display an error message to the user. Process 500 may then end at step 526 so that the user can perform a restore operation to update the firmware (including the boot data) stored in the non-volatile memory.

As described above, processes 400 and 500 illustrates techniques for loading boot data into memory by processing the contents of pages as the pages are read from the non-volatile memory. That is, the electronic device may incrementally process and validate the page contents instead of waiting until all of the pages have been read. It should be understood that this is merely illustrative, and the electronic device may use other techniques for loading boot data. In other embodiments, for example, the electronic device may read all of the pages in a specified boot data storage area of the non-volatile memory. The electronic device may then post-process the read pages using steps similar to those shown in processes 400 and 500. In still other embodiments, pages may be selectively read such that some or all of the non-data pages are skipped over.

It should also be understood that steps may be added, removed, combined, or modified without departing from the scope of the invention. For example, an electronic device may not perform all of the verification steps described above in connection with steps 506, 508 and 517 of process 500. An electronic device may, for instance, be configured to not verify a page's prior page pointer, and may instead rely only on a saved next page pointer to complete verification of the page. Also, steps may be added so that pages from bad blocks are skipped over.

Referring now to FIG. 6, a flowchart of illustrative process 600 is shown for storing boot data in a reprogrammable non-volatile memory. Because, unlike a mask ROM, the non-volatile memory is reprogrammable by an electronic device's operating system and NVM interface, the boot data may be changed or updated without the inconvenience of switching boot ROMs. Process 600 may be performed during a firmware update as part of a restore process. The restore process may be performed at a factory during manufacture or repair of the electronic device, or may be initiated by the end user to update the electronic device.

Process 600 may begin at step 602, and at step 604, a particular non-volatile memory may be identified. The NVM may be identified responsive to a user selection of a NVM installed in the electronic device, or the electronic device may automatically detect the presence of an installed non-volatile memory. The particular non-volatile memory may be identified from a variety of potential NVMs. The potential NVMs may be manufactured by different vendors, and may therefore have different operating specifications (e.g., memory size, number of pages per block, number of blocks per chip, ordering of lower pages versus upper pages, etc.) and error characteristics. Thus, by identifying a particular NVM, a specific set of operating specifications and characteristics may also be identified. In some embodiments, identifying a particular NVM may further include determining memory locations in that particular NVM unit which may be unusable for any given reason, such as bad blocks.

Continuing to step 605, the electronic device may select a boot data storage area in the non-volatile memory. The size of the storage area and the location of the storage area may be based on the particular characteristics of the identified particular NVM. Step 605 may further include freeing up the boot data storage area, such as by erasing outdated boot data or performing other garbage collection procedures to clear space for new boot data. Then, at step 606, the electronic device may choose a subset of pages in the boot data storage area for storing boot data. The subset of pages may also be selected based on the specific operating specifications and characteristics of the identified non-volatile memory, or based on which memory locations are not usable in the particular NVM (e.g., bad blocks). For example, the subset may not include pages that are typically more prone to error on the particular NVM. In some embodiments, the subset may exclude upper pages, whose locations may be determined based on the NVM's particular specifications. Thus, storage of boot data may be customized to the particular non-volatile memory being used in the electronic device.

The electronic device may then store (or not store) boot data in each page of the boot data storage area by iterating through the following steps. At step 608, the electronic device may determine whether the current page in the iteration is in the subset of pages. If not, the electronic device may not program boot data into the current page. The electronic device may instead program a non-data packet in the current page or may leave the current page unprogrammed. If the current page is in the subset, the electronic device may prepare some of the boot data for programming into the page. In particular, at step 612, the electronic device may create a data packet that includes boot data. The data packet may also include metadata, such as a prior page pointer, a next page pointer, a boot data indicator, or a combination thereof. Then, at step 614, the electronic device may program the current page with the data packet.

Continuing to step 616, the electronic device may determine whether there is additional boot data to be stored in the non-volatile memory. If so, process 600 may return to step 608, where the electronic device may perform another iteration of steps 608-614 on the next page of the boot data storage area. If not, process 600 may end at step 618. At this point, all of the boot data may be stored in the non-volatile memory.

It should be understood that the steps of process 600 of FIG. 6 are merely illustrative. Any of the steps may be modified, removed, or combined, and additional steps may be included, without departing from the scope of the invention.

The described embodiments of the invention are presented for the purpose of illustration and not limitation.

What is claimed is:

1. A system comprising:
    a volatile memory;
    a boot ROM for storing program code to begin loading boot data from non-volatile memory to the volatile memory:
    a non-volatile memory comprising:
        a plurality of pages that store boot data for booting up the system; and
        a map indicating nonconsecutive pages of the non-volatile memory in which the boot data is stored, wherein the map enables execution of the same program code regardless of a manufacturer of the non-volatile memory;
    control circuitry that:
        reads an initial page of boot data based on the boot ROM;
        reads, from the non-volatile memory, the map to ascertain the location of the boot data stored in the nonconsecutive pages other than the initial page; and
        loads the boot data from the nonconsecutive pages into the volatile memory using the map.

2. The system of claim 1, wherein the map comprises a linked list, wherein each of the nonconsecutive pages includes metadata comprising at least one pointer pointing to another of the nonconsecutive pages.

3. The system of claim 2, wherein the at least one pointer comprises a next page pointer that references a subsequent page of the nonconsecutive pages.

4. The system of claim 2, wherein the at least one pointer comprises a prior page pointer that references a previous page of the nonconsecutive pages.

5. The system of claim 1, wherein the map comprises a bitmap that describes the contents of the boot data storage area.

6. The system of claim 1, wherein the boot data comprises a first stage bootloader.

7. The system of claim 1, wherein the control circuitry verifies the presence of boot data in the nonconsecutive pages.

8. The system of claim 7, wherein the control circuitry verifies the presence of boot data in each page by identifying a boot data indicator in each page.

9. The system of claim 7, wherein the control circuitry verifies the presence of boot data in each page by employing an error correcting code on each page.

10. The system of claim 1, the system further comprising:
    a non-volatile memory interface operable to access the non-volatile memory responsive to requests by the control circuitry.

11. The system of claim 1, wherein the non-volatile memory comprises NAND flash memory.

12. The system of claim 1, wherein the control circuitry skips over bad blocks using the map.

13. An electronic device comprising:
    a volatile memory;
    a non-volatile memory comprising a plurality of pages;
    a boot ROM for storing program code that configures the electronic device at bootup to:
        read a first page of the non-volatile memory, the first page having boot data and a next page pointer that references a second page of the non-volatile memory, wherein the next page pointer is part of a map indicating nonconsecutive pages of the non-volatile memory in which the boot data is stored, wherein the map enables execution of the same program code regardless of a manufacturer of the non-volatile memory; and control circuitry operative to:
  receive the next page pointer from the first page;
  read the second page of the non-volatile memory;
  verify that the second page contains boot data; and
  load the boot data from the first and second pages into the volatile memory.

14. The electronic device of claim 13, wherein the electronic device signals a boot failure responsive to a failed verification of the second page.

15. The electronic device of claim 13, wherein the electronic device:
  reads an intervening page between the first page and the second page;
  determines, from the next page pointer of the first page, that the intervening page is not the second page; and
  discards the intervening page.

16. The electronic device of claim 13, wherein the electronic device:
  reads all of the pages in a boot data storage area of the non-volatile memory, including the first and second pages;
  subsequent to reading all of the pages in the boot data storage area, examines the next page pointer of the first page; and
  responsive to the examining, discards information obtained from any intervening pages between the first and second pages.

17. The electronic device of claim 13, wherein the first page further includes a prior page pointer, and wherein the electronic device:
  confirms that the prior page pointer indicates that boot data storage begins at the first page.

18. The electronic device of claim 13, wherein the electronic device:
  examines a prior page pointer included in the second page of the non-volatile memory;
  verifies that the prior page pointer references back to the first page.

19. The electronic device of claim 13, wherein the second page contains a second next page pointer that references a third page, and wherein the electronic device:
  reads the third page of the non-volatile memory; and
  verifies that the third page contains boot data.

* * * * *